March 14, 1967 E. F. OBLINGER 3,308,612
RAKE OR SWEEPER
Original Filed Dec. 27, 1963 8 Sheets-Sheet 3

INVENTOR.
Edwin F. Oblinger
BY
Schmeising & Fultz
ATTORNEYS

March 14, 1967   E. F. OBLINGER   3,308,612
RAKE OR SWEEPER

Original Filed Dec. 27, 1963   8 Sheets-Sheet 4

FIG. 5

INVENTOR.
Edwin F. Oblinger
BY
Schmeiding + Fulte
ATTORNEYS

March 14, 1967 E. F. OBLINGER 3,308,612
RAKE OR SWEEPER
Original Filed Dec. 27, 1963 8 Sheets-Sheet 5

FIG. 6

INVENTOR.
Edwin F. Oblinger
BY
Schmeiding & Gulty
ATTORNEYS

March 14, 1967   E. F. OBLINGER   3,308,612
RAKE OR SWEEPER

Original Filed Dec. 27, 1963   8 Sheets-Sheet 6

FIG. 7

INVENTOR.
Edwin F. Oblinger
BY
Schmidt & Fulton
ATTORNEYS

March 14, 1967   E. F. OBLINGER   3,308,612
RAKE OR SWEEPER

Original Filed Dec. 27, 1963   8 Sheets-Sheet 8

INVENTOR.
Edwin F. Oblinger
BY
Schmieding & Fultz
ATTORNEYS

United States Patent Office 3,308,612
Patented Mar. 14, 1967

3,308,612
RAKE OR SWEEPER
Edwin F. Oblinger, Springfield, Ohio, assignor to Parker Sweeper Company, Springfield, Ohio, a corporation of Ohio
Continuation of application Ser. No. 337,697, Dec. 27, 1963. This application June 6, 1966, Ser. No. 562,414
13 Claims. (Cl. 56—27)

The present application is a continuation of my application Serial No. 337,697, now abandoned, which application is a continuation-in-part application of my aplication Serial No. 169,919, filed January 30, 1962, now abandoned.

The present invention relates to a rake or sweeper, and particularly to the type employing a reel having outwardly extending resilient tines or teeth. More particularly, such sweeper or rake includes an open bottom frame having side pieces, which are carried by wheels. Transmission mechanism is carried by the frame. In one form of the invention, a debris receptacle is disposed rearwardly of the frame of the sweeper for catching and retaining leaves or other debris on the lawn or walk. In another form of the invention, the tines are employed primarily for loosening and raising the thatch from the surface of the ground.

The improved rake comprises a reel which is rotated by the transmission mechanism. This reel includes axle means in the form of a shaft. A plurality of rods are arranged parallelly of the shaft and are spaced at an equal distance from the axis of the shaft. The reel also includes a plurality of resilient tines. Each tine includes an integrally formed coil surrounding a rod, and includes a portion which extends outwardly of the rod; the ends of the outwardly extending portions form rake teeth. The opposite ends of the tines are suitably connected to the reel. The free or outer part of each of the tines is disposed approximately radially of the axis of the shaft, but the portion intermediate the outer part and the coil of a tine is disposed, normally rearwardly at an angle relative to the radiant of the axis of the shaft.

Spacing means in the form of washers are disposed between the coils of the tines for separating the coils from one another.

In the embodiment employing a debris receptacle, the tines of the sweeper are of such length that when they are rotated, the outer ends thereof engage at least a part of the inside surface of the hood, so as to flex the tines rearwardly during at least part of their rotating movement while passing by the hood.

In the embodiment in which the tines are used primarily for loosening the thatch and raising the same off the surface of the ground, the ends of the tines extend to the surface of the ground.

Stops are provided on the reel for limiting the extent of bending movement that can be imparted to the tines. These stops are in the form of rods which extend parallelly with the rods which carry the coils of the tines. Certain of these rods function also as retaining means for holding the tines on the reel. Also the rods which carry the coils of the tines are so disposed that they limit the extent of bending movement that can be imparted to the tines.

Other features and the advantages will be apparent from the following description, reference being had to the accompanying drawings wherein preferred embodiments of the invention are illustrated.

Referring more in detail to the drawing, the sweeper 20 includes a frame 22. The frame includes two side plates 24 and 26 which carry, respectively, axles 28 and 30. These axles are carried by wheels 32 and 34. The side plates are fastened to one another by a plurality of rods 36, 38 and 40. A platform or sub-frame 42 is carried by the forward parts of the side frames. This platform carries a motor, herein shown as an internal combustion engine 44. The engine is coupled through suitable transmission mechanism including the belt 46 to the wheels 32 and 34 rotating the same, and also to the reel for rotating the same, said reel being hereinafter described. Such transmission mechanism is well known in the lawn mower and lawn sweeper art. A gearing is disposed between the wheels and the reel, such as that shown in the Dunham Patent No. 2,727,265 of Dec. 20, 1955, for driving the reel at a relatively higher r.p.m.

The frame 22 includes a hood 48 which is attached to the side plates 24 and 26 by bolts 51. This hood includes an upper, arcuately shaped portion 50 which is formed of sheet metal and spans the area between the side plates. The side plates carry axle means in the form of a shaft 52, which latter is driven by the aforementioned transmission mechanism. The shaft is a part of the reel 54, aforementioned. The shaft is so disposed that the reel lies rearwardly of the hood 48 and a major portion thereof lies below the upper portion of the hood portion 50.

A U-shaped frame 56, preferably formed of sheet metal tubing, has the front ends of the legs 58 thereof flattened and pivotally supported by the axles 28 and 30. These legs extend rearwardly and carry a platform 60 for supporting a removable debris receptacle 62. The rear end of the platform is supported on rollers 64.

Another U-shaped frame 65, also preferably formed of sheet metal tubing, has the front ends of the legs 66 thereof flattened and pivotally supported by the axles 28 and 30. The frame 65 is urged upwardly by a pair of spring rods disposed on opposite sides of the debris receptacle 62, one of said rods being shown at 68. They rest upon the platform 60 and press upwardly on the underside of legs 66 of frame 65. Plates 70 are fastened to the legs 66 by screws 72. Each of these plates is provided with an arcuately shaped slot 74, the axes of the slots being the axis of the axles 28 and 30. Bolts 76 fastened to the legs 58 of frame 56 extend into these slots and the heads of these bolts to limit sidewise movement of the lower portions of the plates. Each of the lower ends of slots 70 forms an upwardly facing shoulder adapted to engage the shank of the bolt to thereby limit the extent to which the spring rods 68 can lift the frame 65 and plates 70.

The ends of rod 40 are threaded and extend through the slots 74 and receive wing nuts 80. When these nuts are loosened, the rod 40 can be moved upwardly or downwardly relative to the plates 70. By moving the rod upwardly, the side plates are rotated counterclockwise, as viewed in the figures, causing the reel 54 to be raised. Conversely, the reel can be lowered by moving the rod 40 downwardly. Thus the reel can be adjusted relatively to ground level and held in adjusted position when the wing nuts are tightened.

Figure 1:
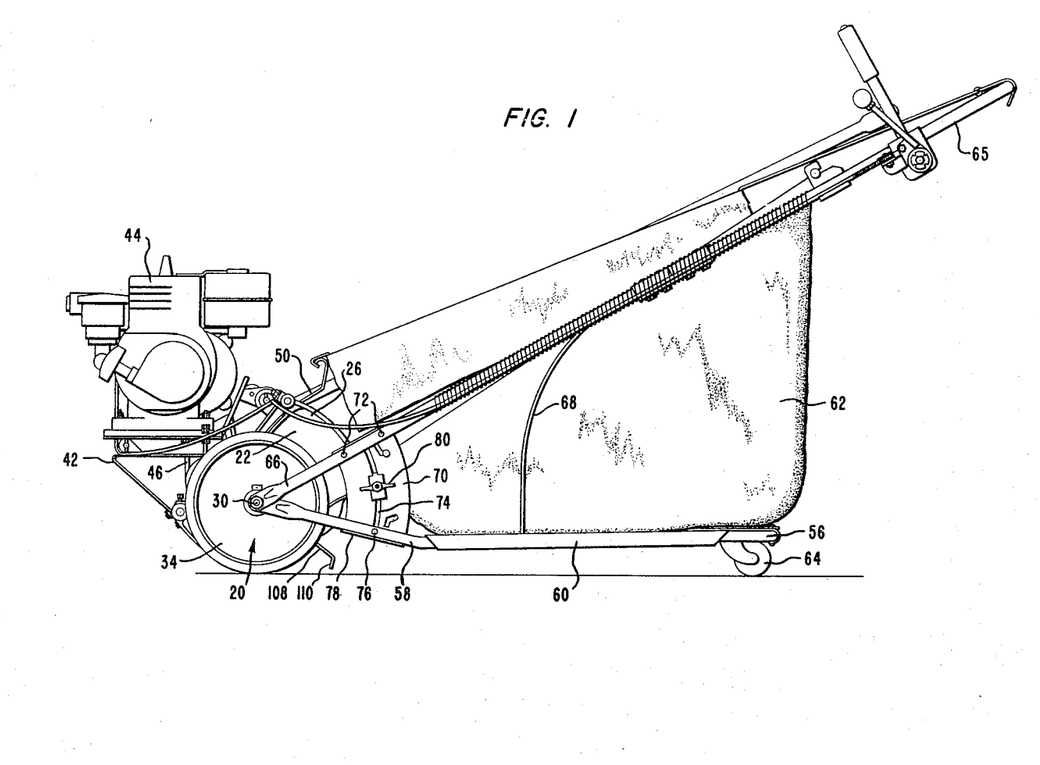
FIG. 1 is a view, in elevation, showing the left side of the sweeper of the type employing a debris receptacle.

From the foregoing, it is apparent that the reel can be lowered at will by merely pushing downwardly on the handle frame 65. The springs rods 68 will return the handle to the position shown in FIG. 1.

Suitable clutch mechanism is interposed between the engine and the gearing which drives the tractor wheel and the reel. The control for the clutch is carried by the handle frame 65. Also an engine accelerator is provided for the carburetor for the engine and an accelerator lever is also carried by the frame 65. The clutch control and accelerator are disposed so that the operator can manipulate the same while guiding the sweeper through the frame 65.

Referring more in detail to the reel 54, it includes a plurality of discs 84, each formed of two complementing halves 86 and 88 having hub sections 90 and 92, respectively, which are fastened to the shaft 52 by bolts 97 and nuts 96. Preferably four discs 84 are provided, one at each end of the reel and two intermediate the ends and spaced to define three equally spaced areas therebetween.

Figures 8, 9:
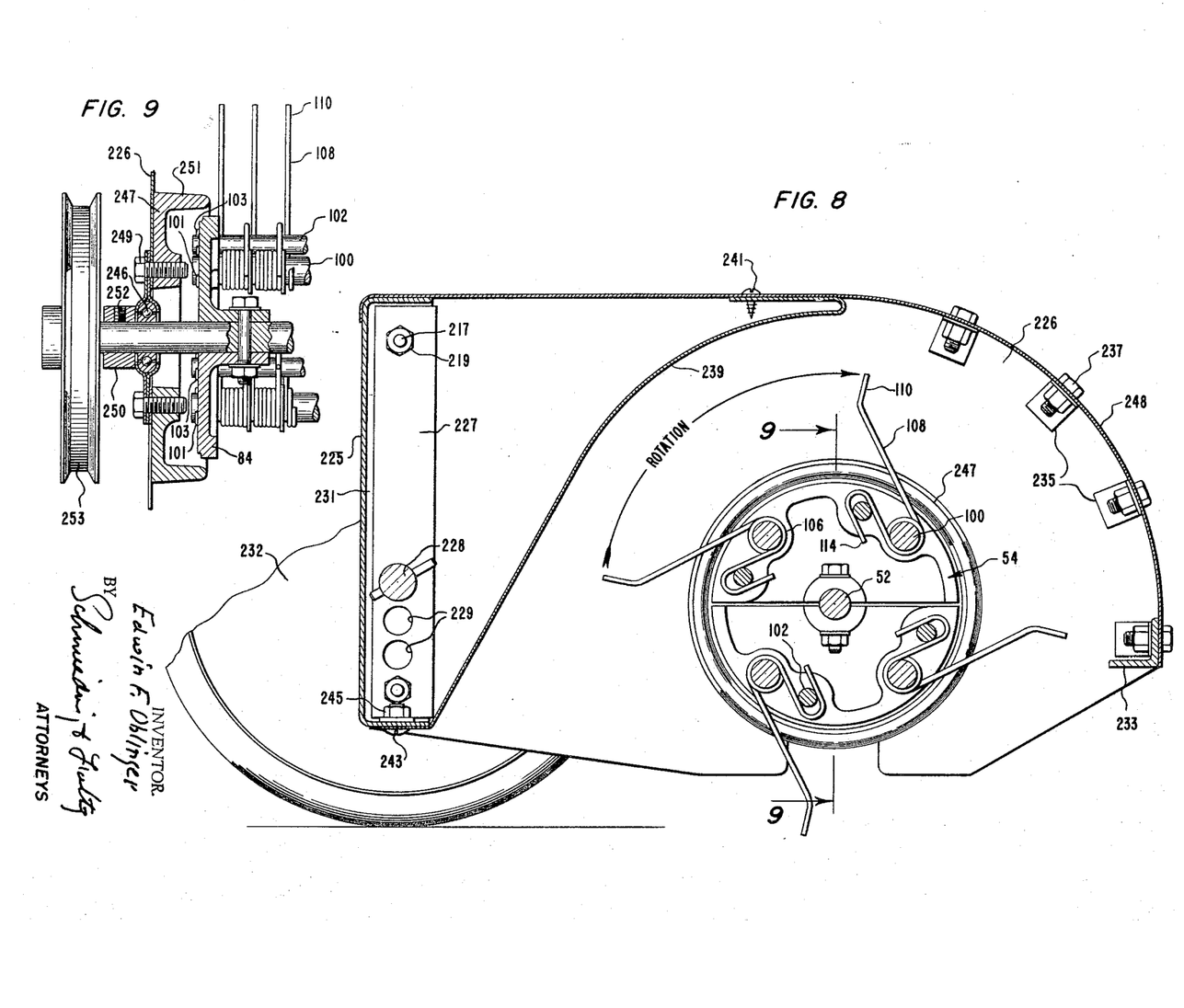
FIG. 8 is a longitudinal cross sectional view of the lower part of the rake, shown in FIG. 7, but on a larger scale.
FIG. 9 is a fragmentary sectional view taken along line 9—9 of FIG. 8.

A series of rods 100 extend through these discs and may be held in place by cotter keys 101, as shown in FIG. 9. These rods are arranged parallelly of the shaft 52 and are spaced the same distance from the axis of shaft 52. Four of these rods 100 are provided and each is equally spaced from the next adjacent like rod. A second series of rods 102 are likewise arranged parallelly of shaft 52, and each is spaced the same distance from the axis of the shaft 52 and each is equally spaced from the next adjacent like rod. The rods 100 and 102 are arranged in pairs for supporting four series of tines 104.

Figure 4:
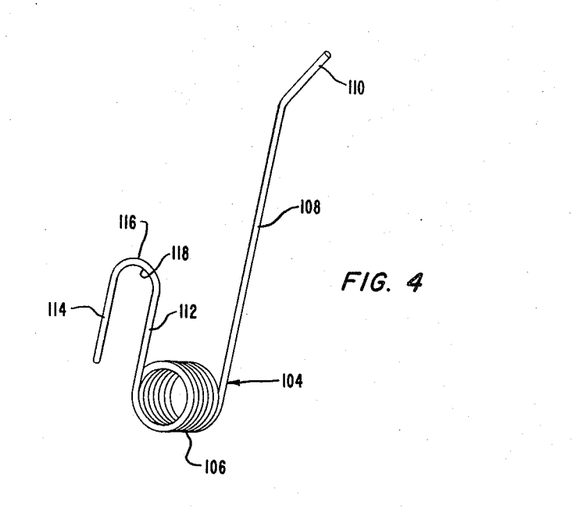
FIG. 4 is a perspective view of one of the tines.

Referring to FIG. 4, it will be observed that each of these tines 104 includes a coil 106 of at least two complete turns and preferably includes six turns, a portion 108, an end part 110, a portion 112, a portion 114, and a yoke 116 which connects portions 112 and 114 to form a hook 118. The portions 108, 112 and 114 are arranged parallelly. Each tine is an integral element, is formed of resilient steel wire, such as music wire. The embodiment as shown in FIGS. 2, 3, 5 and 6 is one half size, and in the actual structure, the wire has a diameter of between .08 and .085 inch, and the overall length of the portion 108 and part 110 is approximately three and one half inches measured from the axis of the coil. It will be understood that on larger sweepers, the size of and the length of wire will be increased. The part 110 is disposed at an obtuse angle of approximately 140 degrees with respect to the portion 108. This angle should be maintained within ten degrees. The part 110 is approximately three-quarters of an inch.

The coils 106 are carried by the rods 100. Washers 120 are disposed between the coils to separate the same from one another. These coils and washers, together with the two intermediate discs 84, substantially fill the space between the two outer discs 84. The overall width of a coil and a washer is approximately five-eighth inch. The inside diameter of the coils is slightly larger than the diameter of the rods 100, thereby permitting contraction of the coil diameter when the portion 108 is moved toward portion 112. The hook 118 of each tine is hooked about a rod 102 so as to prevent displacement of the tine. Rods 102 extend through discs 84 and are held in place by cotter keys 103. Each of the rods 100 and 102 is provided with a nylon coating which materially minimizes abrasive action on the tines.

While the inside diameter of the coil 106 is slightly larger than the diameter of the rod 100, so as to permit contraction of the coil, the rod nevertheless limits the bending stress of the tines at the anchor therefor i.e. the lever action movement of the coil is limited. This lever action is imposed when stress is imparted to the tine, by its engagement with the grass or other objects, and which lever action is imposed upon the coil due to the fact that the stress is imparted to the coil at a point which is removed from its anchor, at 102, the distance equal to approximately the width of the six turns of the coil.

The lower portion 50 of the hood is substantially concentric with the shaft 52 of the reel to approximate a horizontal line indicated at 121 and the portion 122 of the hood above said line veers rearwardly and upwardly to form a deflecting surface for the debris.

Figure 5:
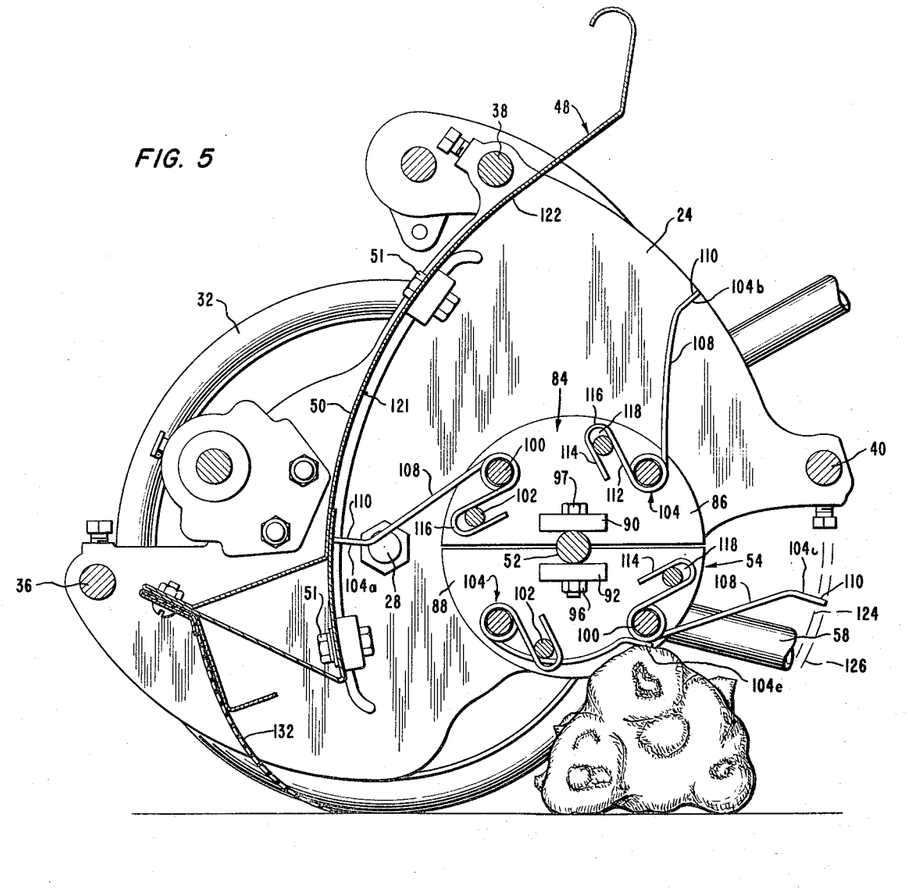
FIG. 5 is a view somewhat similar to FIG. 2, but is simplified and shows certain deflection assumed by the tines while working.
Figure 6:
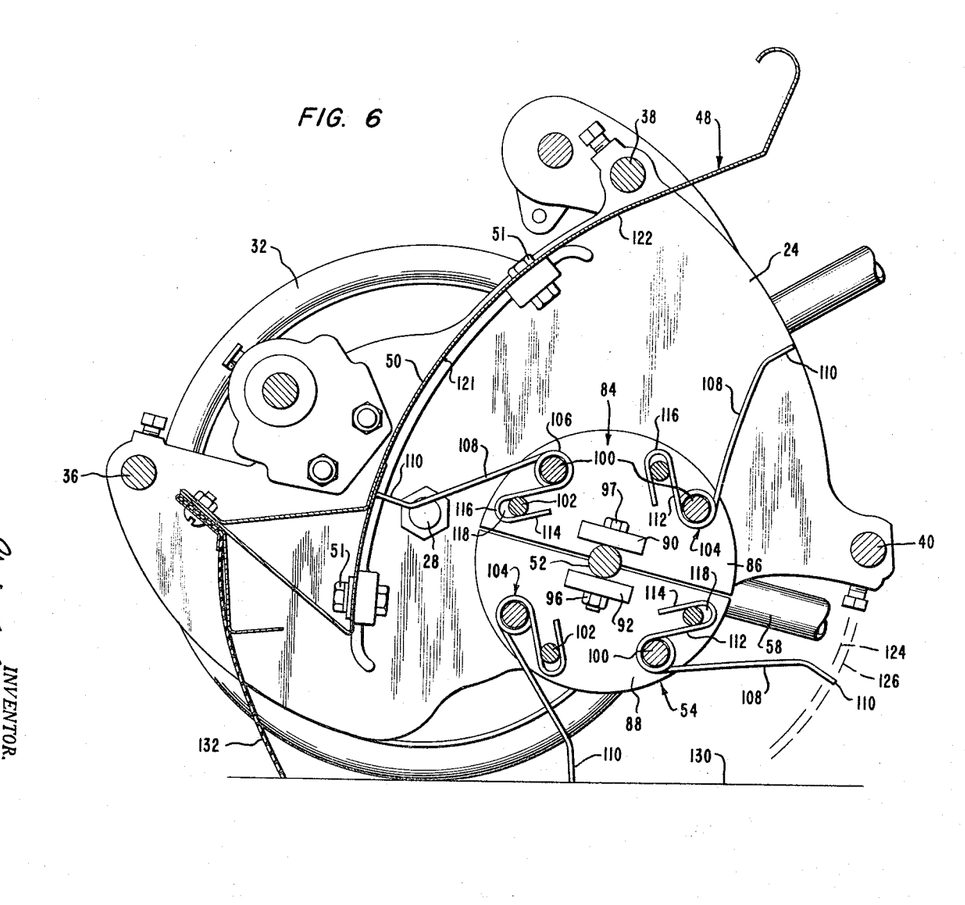
FIG. 6 is a view similar to FIG. 5, but showing the reel lowered to thatch removing position.

While stationary, the ends of the tines extend to a line indicated by 124; however, at normal speed of rotation, the tines are extended, due to centrifugal force, to the line indicated by 126. That portion 50 of the hood 48 is so spaced from the axis of the shaft and the tines are of such length that the outer ends thereof engage the inner surface of hood portions 50, and are impeded in their forward movement and thereby flexed rearwardly. Then, as the ends of the tines pass the line 121, such dragging over the inner surface of the hood ceases, whereby the energy stored therein is utilized to fling the debris, which lies forwardly of the tines, upwardly and rearwardly with sufficient force to cause the debris to be thrown to the rear portions of the receptacle 62. Of course, the upper portion 122 of the hood is so disposed to deflect the debris so that it flows in the proper direction. Thus it is apparent that the part 122 of the hood veers upwardly and rearwardly from a sector of a substantially cylindrical area encompassed or defined by the rotating tines. FIG. 5 shows at 104a the position of the deflected tines rearwardly by the engagement with the inner surface of the hood portion 48, and also shows the uppermost tine, at 104b, in the position to which it is moved through the resilient reaction thereof after being released from the dragging effect thereon by its engagement with the inner surface of hood portion 48. FIG. 5 also shows, at 104c, the position the tines assume when extended forwardly and outwardly by centrifugal force during normal r.p.m. of the reel.

Figure 2:
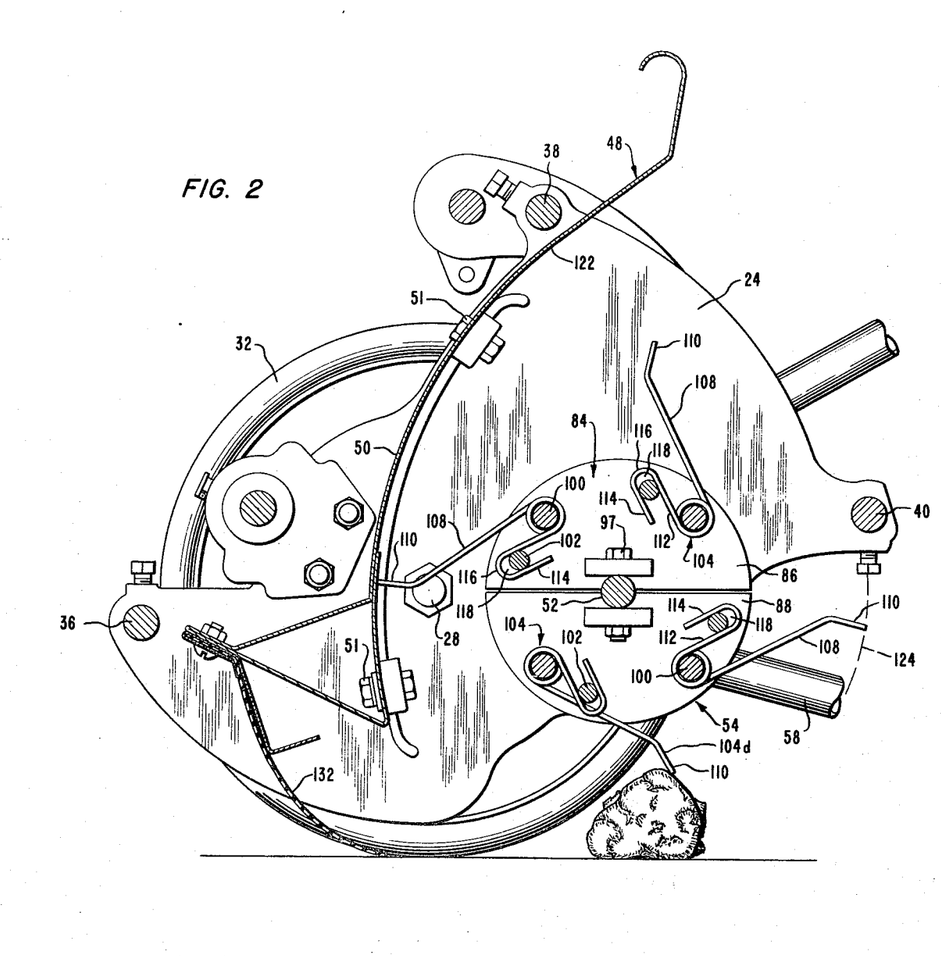
FIG. 2 is a view in cross section of the frame, the left side frame and left wheel being removed.
Figure 3:
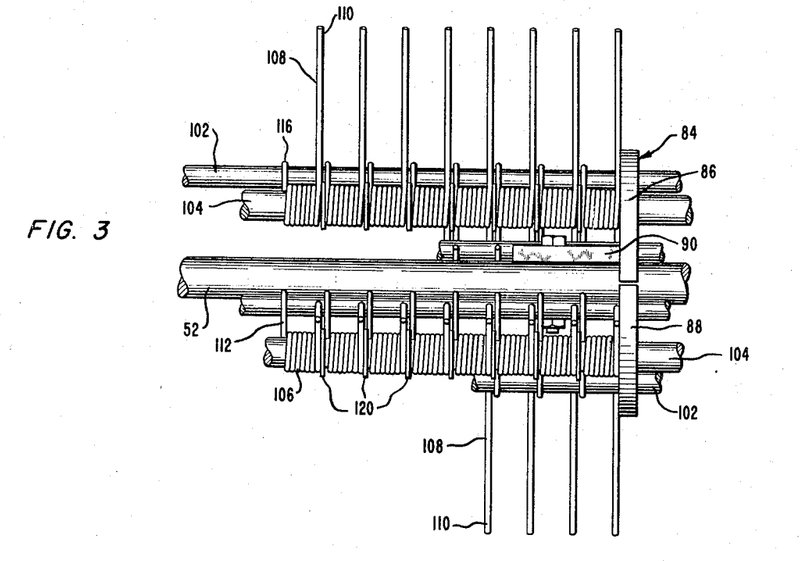
FIG. 3 is a fragmentary top plan view of the improved reel.

Now referring to FIG. 2, there is shown, at 104d, as an example, the position of the tines when said tines engage an object such as a stone, walnut, etc. It will be observed that, should said object arrest the forward movement of the tine to such an extent as to effect engagement of the intermediate portion 108 thereof by the trailing rod 102, then in that event, the tine fulcrum about the rod 102, to materially increase its resistance to flexing and thereby increase its ability to overcome the inertia of the object and fling the object forwardly as desired. The pressure required to flex a tine from normal position to a position in which it touches a trailing bar 102 is approximately three-fourths of a pound. The pressure required to move such objects as a walnut or a small stone varies from three to five pounds, and since the tine now fulcrums about the rod 102, such pressure is readily attained.

Again referring to FIG. 5, a tine is shown, at 104e, in the position it, or a plurality thereof, assume when engaging a relatively large object such as a root or boulder. It will be observed that the tine engages the coil of the tine on rod 100 which trails the rod on which the coil of the tine is mounted. Consequently, the rods 100, through the coils of the tines, provide stops for the tines. The positions of the rods 100 are such that they confine the deflecting movement that can be imparted to the tine to below the elastic limit of the tine. Thus the tines are never subject to a bending strain having a value which distorts the same. The pressure required to deflect the tines from normal position to that shown at 104e is approximately twelve pounds.

When the area to be swept is relatively high with respect to the ground level, as for example, when leaves are to be swept from relatively tall grass, the rear end of the frame 22, including the reel, is raised and then fastened in the raised position, as previously explained. When it is desirable to remove thatch, for example, dried grass clipping, lying close to the ground, then the rear end of the frame 22 is lowered to the position shown in FIG. 6 wherein the ends of the tine move at or close to the ground level indicated at 130.

The present disclosure includes the flexible hood extension 132 for the purpose as disclosed in the Patent No. 3,022,530.

The tine portions 108, 112, and 114 are arranged parallel merely for the purpose of providing for simplicity of visual inspection of the contour of same. The pairs of rods 100 and 102 for supporting a series of rods are so disposed with respect to one another and to the trail pairs of rods so that they accommodate the parallellism of the rod portions 108, 112 and 114, and also form desired stops for limiting flexing of the tines, for the reasons heretofore set forth.

It has been found, in actual practice, that when the tines are disposed in the neighborhood of being radial with respect to the axis of the shaft 52, the debris would move inwardly instead of the desired outward movement toward the hood, resulting in clogging of the interior of the reel and poor efficiency. Therefore, the tines are disposed as shown, wherein the substantially radially extending outer parts have a tendency to direct the debris toward the intermediate portions 108 and these intermediate portions, each being disposed at an obtuse angle with respect to the radiant of the axes of the reel and the coil of the tine and in trailing relationship with respect to said radiant, cause the debris to be flung outwardly toward the hood.

From the foregoing, it is apparent that the present invention has many advantages. The reel operates at normal speeds ranging from heavy loads at 250 r.p.m. to light loads at 450 r.p.m. These heavy loads are encountered, for example, when deep thatch is being picked up from relatively tall grass, and light loads are, for example, picking up leaves from short grass. In all events, thorough cleaning is assured and the debris also is always flung rearwardly sufficiently to be received by the rear portion of the debris receptacle.

Should relatively large objects such as walnuts, or stones of the size of walnuts be encountered, the tines, upon being engaged by the trailing rod 102, fulcrum about the rod, i.e., their lever arms are foreshortened so as to materially and immediately increase their effectiveness for moving such objects.

Should relatively unwieldable objects such as boulders or tree roots be encountered, the tines will be engaged by the coils on the tine of the trailing rod 100. Such engagement prevents the tines from being distorted to beyond their elastic limits. In most cases, upon engagement of the rake with such unwieldable objects, the tines slide over the object and in so doing lift the entire mechanism so as to move over such objects.

Steel tines, heretofore employed have been unsuccessful due to the fact that when they encounter an obstinate object, they break.

Longevity of the present steel tines is attributed to the use of at least two turns in the coil and the aforementioned limit of bending stress at the anchor section of the coil. Since the lever action of the coil is limited by the rod 100 while permitting some contraction of the diameter of the coil of the tine, the unit of stress imposed on the tine is dissipated progressively through the plurality of turns in the coil.

Thus it becomes apparent that the rake, when properly adjusted for sweeping grass or leaves without damaging the live turf, will pick up simultaneously and effectively such objects as nuts, heavy twigs and small stones.

The reel is designed so that it is self cleaning. By spacing the tines from one another laterally, as previously described, the tines pick up the grass clippings in a highly efficient manner. It has been found that, if the adjacent tines of a series are spaced too far from one another, the tines do not fling such clippings forwardly far enough to be ejected upwardly along the hood and rearwardly to the receptacle. It has also been found that when the adjacent tines of a series are too close to one another, matting of the grass clippings takes place about the tines.

As previously stated, the tines are shaped so that the outer parts thereof dislodge the debris and direct it inwardly, and the portions intermediate the outer portions and the coils are shaped so as to prevent the debris from moving inwardly to the interior of the reel, but, to the contrary, cause the debric to be flung forwardly at the bottom of the reel tine path, then upwardly along part of the hood, and then upwardly and rearwardly, toward the debris receptacle.

Thus from the foregoing, it is apparent that the reel is maintained clean at all times, whereby it functions efficiently constantly.

It will be observed also that due to the shape of the tines, the entire rake can be moved rearwardly without injuring the tines whether the reel is operating at debris pick-up speed or the reel is stationary. Also, the rake can be moved forwardly while the reel is stationary. The tines will yield rearwardly if an object is encountered thereby and then slide over the object.

The flexible hood extension at the lower part of the hood, assures constant contact with the turf forwardly of the reel so that materials such as nuts and stones are not propelled forwardly of the hood but instead are picked up by the tines.

The resiliency of the tines assures reasonable life expectancy thereof. Yet tines can be removed and replaced readily. These tines of a series are strung loosely on a pair of rods 100 and 102, and these rods can be removed readily by merely removing cotter keys.

Figure 7:
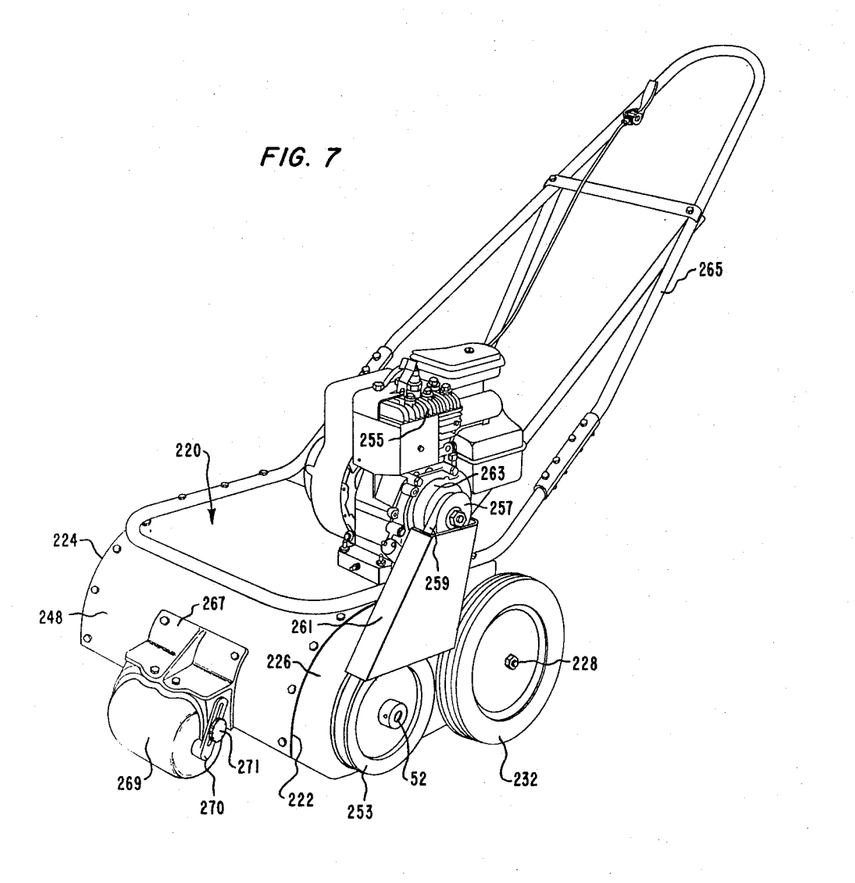
FIG. 7 is a perspective view of the embodiment which is used primarily for loosening and raising thatch off of the surface of the ground.

Referring now to the rake 220, shown in FIGS. 7 and 8, it includes a frame 222. The frame includes two side plates 224 and 226 and a rear plate 225. Each side plate is reinforced at the rear by vertically extending metal straps 227. The rear plate 225 is provided with forwardly extending flanges 231. The side plates and rear plate are secured to one another and to the straps 227 by bolts 217 and nuts 219. The side plates are provided with several pairs of aligned holes 229 for receiving an axle 228, the latter being carried by wheels 232. These wheels lie alongside the side plates 224 and 226. The front of the side plates are reinforced by a horizontally extending angle iron 233. Brackets 235 are riveted to the front section of the side plates 224 and 226. A hood 248 is bolted to these brackets by bolts 237. A baffle 239 is secured to the underside of the hood 248 by screws 241, and to the bottom of plate 225 by bolts 243 and nuts 245.

The reel 54 is the same as that disclosed with respect to the sweeper 20. The shaft 52 of the reel is carried by bearings 246, and each of these bearings is secured to the side plates 224 and 226, through a pair of segment-shaped brackets 247 and bolts 249. End play of the shaft is limited by rings disposed alongside the outside of the bearings 246, one of which is shown at 250. These rings are held in place by set screws 252. The pair of segments form a circular flange 251, which surrounds the end discs 84 of the reel, and prevent entanglement of debris or thatch between the discs 84 and the side plate. Such flanges can be applied to the sweeper also.

The curvature of the hood 248 is generated at the axis of the reel shaft 52, from the front to the area directly above said axis. Also the curvature of the upper section of the baffle 239 is generated at the axis of the reel shaft.

The left end of the shaft 52 carries a pulley 253 which is driven by a motor, in the form of an internal combustion engine 255, through an engine driven pulley 257 and belt 259. The belt is covered by a guard 261. A clutch 263 is interposed between the engine shaft and pulley 257. The machine is guided by a handle 265. The front of the hood may carry a bracket 267. A roller 269 is attached to the slotted links 270. These links are secured to bracket 267 by screws 271. These screws extend through the slots in the links.

In this embodiment of the invention, the reel turns clockwise, as viewed in FIG. 8, whereby the tines, upon engaging the turf, powers the machine forwardly across the ground. Therefore, motor power is not applied directly from the engine to the wheels 232.

It will be observed that a greater clearance is provided between the front section of the side plates 224 and 226 and hood 248 and the ground surface, than the remaining portion of the hood and side plates. This is done for the purpose of providing ready movement of the machine over tall grass. In operation, the reel is actuated preferably at approximately 600 to 1,500 r.p.m., depending upon the size of the machine and the thickness and height of the turf. The free ends of the tines loosen all of the thatch down to the surface of the ground. If desirable, after loosening of the thatch, a lawn sweeper is employed to collect the thatch. It has been found that clogging of thatch in the hood is eliminated by the use of the baffle 239.

In some cases, it is desirable to dispense with the front roller 269, particularly when the machine is employed on ground having shallow gullies. Those experienced can manipulate the machine without the roller 269. They find it convenient to raise or lower the handle about the wheels 232 when it is desirable to raise or lower the tines to accommodate uneven terrain, or when it is desirable to increase or decrease the depth of the tine actions. This is done readily without the roller 269.

Difficulty has ben experienced in the clogging of the hood with thatch when the growth is heavy. It has been found that this clogging can be released by raising the rear of the machine, permitting the escape of thatch. Under such condition, it is advisable and desirable to maintain the rear of the machine elevated. This can be done by lowering the axle 228 so as to raise the rear of the machine. One form of adjusting the height of the rear of the machine, lies in lowering the axle 228 to a pair of aligned lower holes 229.

Figure 10:
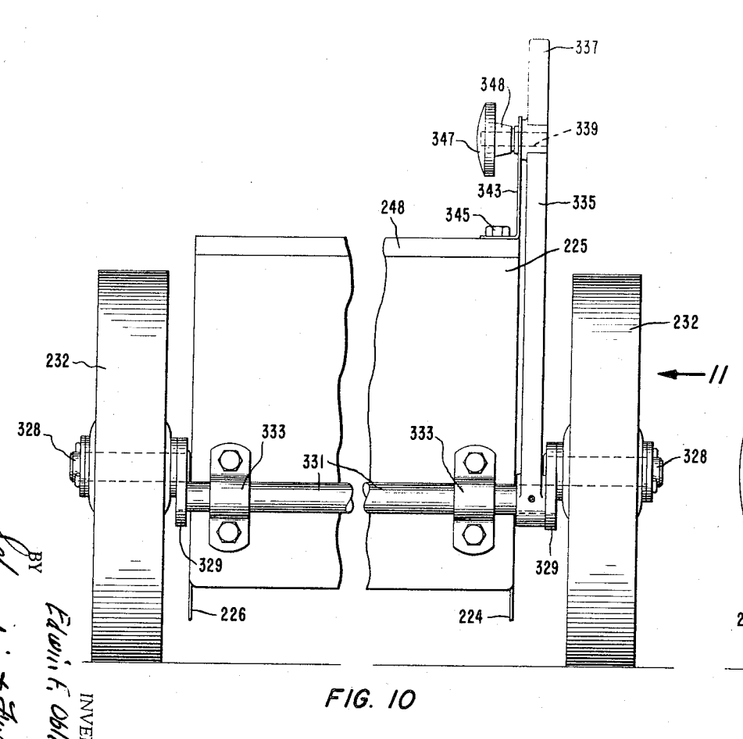
FIG. 10 is a fragmentary rear view of a modified form of rake showing mechanism for raising and lowering the rear end of the rake.
Figure 11:
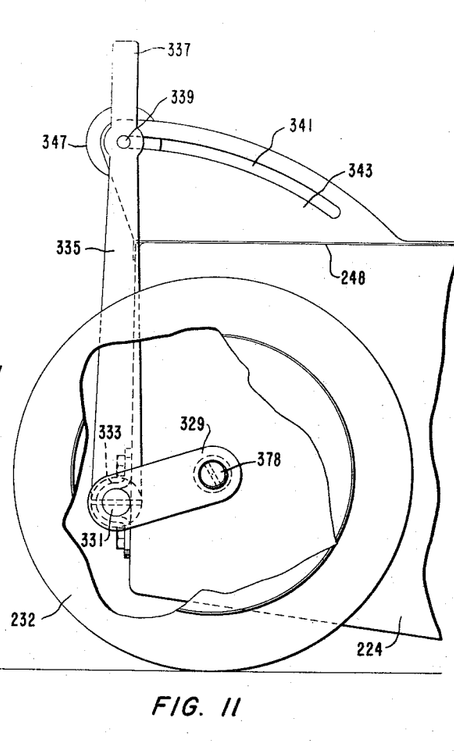
FIG. 11 is a view looking in the direction of arrow 11 of FIG. 10, part of the supporting wheel is broken away to show the mechanism for raising and lowering the rear end of the rake.

Another form of adjusting the height of the rear of the machine is shown in FIGS. 10 and 11. In this embodiment, separate axles 328 are provided for the wheels 232. These axles are carried, respectively, by an arm 329 which is fixed to a horizontally extending shaft 331. Shaft 331 lies parallelly of the axles 328 and is journaled in bearing 333 which is attached to the rear side of rear plate 225. Vertically extending arm 335 is fixed to shaft 331 and extends above the rear of hood 248 and terminates as a handle 337. A pin 339 is carried by arm 335 below the handle and above the hood and extends parallelly of axles 328 and shaft 331. This pin rides in and is guided by the walls of a slot 341 in a bracket 343. This bracket is secured to the top of the hood 248 by screws 345 and bolts (not shown) and extends at right angles with respect to the axis of the axles 328. The slot is designed so that as the arm 335 is moved forwardly the shaft 331 will be raised, raising the rear end of the frame. The extended end 345 of the pin 339 is threaded to receive a hand nut 347 which when tightened secures the pin 339 in adjusted position with respect to bracket 343. Thus the rear end of the frame can be raised or lowered and held in desired adjusted position.

It has been found in actual practice, that a heavier and healthier stand of grass follows when the thatch (dead grass clippings) is removed from the surface of the ground. Some of the reasons for this is that fertilizer is spread directly on the earth and is readily absorbed, since the fertilizer is not isolated by a thatch barrier; reseeding of existing lawn is much more effective without the thatch barrier; the thatch barrier insulates the soil from sunlight; and the thatch is a barrier to the penetration of water, i.e., when a layer of thatch is present, the water tends to puddle and is evaporated readily after rain or sprinkling.

While the forms of embodiments herein shown and described constitute preferred forms, it is to be understood that other forms may be adopted falling within the scope of the claims that follow.

I claim:
1. A reel of the rake type, comprising in combination:
   (A) A rotatable reel frame including:
      (1) means forming a plurality of spaced and axially aligned axles;
      (2) a plurality of tine-supporting means arranged longitudinally of and alongside of the axis of the axles and spaced at an equal distance from said axis;
      (3) a plurality of resilient tines, each having a coil portion supported by the tine supporting means, said tines each including:
         (a) an elongated portion extending outwardly and trailwise from the coil supporting portion at an acute angle relative to a radially extending line passing through the axis of the reel and the coil supporting means;
         (b) an end portion extending outwardly from the end of the elongated portion, said end portion being materially shorter than the elongated portion and extending substantially radially of said axis of the reel;
      (4) and means for supporting the inner ends of the tines.

2. A reel as defined in claim 1, characterized in that the tine coil supporting means comprises a plurality of rods arranged longitudinally of and alongside said axis and at equal distances from said axis.

3. A reel as defined in claim 1, characterized in that the tines are disposed approximately five-eighths of an inch from the next adjacent tine on the same coil support means.

4. A reel as defined in claim 2, characterized to include:
   (5) spacing means on the rods interposed between adjacent coils of the tines.

5. A reel of the rake type, comprising in combination:
   (A) A rotatable reel frame including:
      (1) means on the frame forming a plurality of spaced and axially aligned axles;
      (2) a plurality of tine-supporting means arranged longitudinally of and alongside the axis of the axles and spaced at an equal distance from said axis;
      (3) a plurality of resilient tines, each having a portion supported by the tine-supporting means and having a free end;
      (4) and means on the frame intermediate adjacent tine-supporting means and disposed for engagement by those portions of the tines which are disposed intermediate the supported ends and the free ends thereof for arresting movement of said portions when the tines are arrested by objects engaged by the free ends of the tines during rotation of the reel.

6. A reel as defined in claim 5, characterized in that the tine-supporting means comprises a plurality of supports, adjacent supports being equally spaced from one another and alongside the axis of the reel, each of said supports supporting a series of tines, the support trailing the support, which supports a series of tines, forming means for limiting the extent of movement of said series of tines toward the axis of the reel.

7. A reel as defined in claim 5, characterized in that the tine-supporting means comprises a plurality of rods, adjacent supports being equally spaced from one another and alongside of the axis of the reel, each of said rods supporting a series of tines, the rod trailing the rod supporting a series of tines forming the means for limiting the extent of movement of said series of tines toward the axis of the reel.

8. A reel as defined in claim 7, characterized in that the tines each include a coil surrounding a coil supporting rod.

9. A reel as defined in claim 7, characterized in that the tines each include a coil surrounding a coil supporting rod, and further characterized in that the other ends of the tines are each in the form of a hook, hooked about the last mentioned means (4).

10. A power actuated rake, comprising in combination:
(A) A frame having an open bottom and open rear, said frame including:
(1) side pieces;
(2) an arcuately shaped hood at the front thereof, curving upwardly and rearwardly;
(B) transmission mechanism carried by the frame;
(C) a debris receptacle connected with and disposed rearwardly of the frame;
(D) a rotatable reel including:
(1) axle means carried by the frame and operatively connected with the transmission mechanism and disposed between the hood and debris receptacle;
(2) a plurality of outwardly extending inherently resilient tines supported by the supporting means, said tines having such length that the free ends engage the rear side of the hood and are arrested by such engagement during rotation thereof with the reel, the upper end of the hood terminating immediately adjacent a vertical plane passing through the axis of the reel.

11. A power actuated rake, comprising in combination:
(A) A frame having an open bottom and open rear, said frame including:
(1) side pieces;
(2) an arcuately shaped hood at the front thereof, curving upwardly and rearwardly;
(B) transmission mechanism carried by the frame;
(C) a debris receptacle connected with and disposed rearwardly of the frame;
(D) a rotatable reel including:
(1) axle means carried by the frame and operatively connected with the transmission mechanism and disposed between the hood and debris receptacle;
(2) a plurality of inherently resilient and outwardly extending tines;
(3) said hood having a portion engaged by the tines, said portion lying above a horizontal plane intersecting the axis of the reel;
(4) said hood having a second portion disposed upwardly and rearwardly of the first mentioned portion, said second mentioned portion being spaced forwardly and upwardly from the forward-upper segment of a substantially cylindrical area defined by the rotating tines.

12. A rake comprising in combination:
(A) An open bottom frame including:
(1) means forming opposite side frame members and a cover spanning the frame members;
(B) horizontally extending axle means on the frame disposed transversely of the side frame members;
(C) supporting wheels on the axle means for supporting the frame on the ground;
(D) mechanism providing the sole means for propelling the frame forwardly and for raking, said mechanism consisting of:
(1) a rotatable reel disposed between the side frame members and below the cover, said reel including:
(a) horizontally extending axle means carried by and disposed transversely of the side frame members;
(b) a series of resilient and flexible tines connected with and extending outwardly of the second mentioned axle means and engageable with the material to be raked;
(c) transmission mechanism for rotating only the reel and in a clockwise direction when the rake is viewed from the right side thereof;
(d) and a motor carried by the frame for actuating only the transmission mechanism.

13. A rake as defined in claim 12, characterized to include:
(E) an adjustable means for varying the height of the rear end of the frame, relative to the ground level.

References Cited by the Examiner

UNITED STATES PATENTS

| | | | |
|---|---|---|---|
| 2,992,525 | 7/1961 | Irish | 56—372 |
| 3,024,582 | 3/1962 | Warnke | 56—27 |
| 3,112,593 | 12/1963 | Ronning | 56—24 |

ABRAHAM G. STONE, *Primary Examiner.*

ANTONIO F. GUIDA, *Examiner.*